(12) United States Patent
Stålberg et al.

(10) Patent No.: US 11,859,368 B2
(45) Date of Patent: Jan. 2, 2024

(54) ELECTRIC POWERTRAIN AND A WORKING MACHINE

(71) Applicant: VOLVO CONSTRUCTION EQUIPMENT AB, Eskilstuna (SE)

(72) Inventors: Daniel Stålberg, Eskilstuna (SE); Per Mattsson, Sölvesborg (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 43 days.

(21) Appl. No.: 17/785,305

(22) PCT Filed: Dec. 19, 2019

(86) PCT No.: PCT/EP2019/086228
§ 371 (c)(1),
(2) Date: Jun. 14, 2022

(87) PCT Pub. No.: WO2021/121594
PCT Pub. Date: Jun. 24, 2021

(65) Prior Publication Data
US 2023/0029811 A1 Feb. 2, 2023

(51) Int. Cl.
*E02F 9/20* (2006.01)
*B60K 1/02* (2006.01)
(Continued)

(52) U.S. Cl.
CPC ............... *E02F 9/202* (2013.01); *B60K 1/02* (2013.01); *B60K 17/08* (2013.01); *B60K 17/28* (2013.01);
(Continued)

(58) Field of Classification Search
CPC .......... E02F 9/202; B60K 1/02; B60K 17/08; B60K 25/06; B60K 2025/005; F16H 2/085; F16H 2200/0021
See application file for complete search history.

(56) References Cited

FOREIGN PATENT DOCUMENTS

| CN | 110203069 A | 9/2019 |
| CN | 116348328 A * | 6/2023 |

(Continued)

OTHER PUBLICATIONS

International Search Report and Written Opinion of the International Searching Authority, PCT/EP2019/086228, dated Aug. 28, 2020, 12 pages.

(Continued)

*Primary Examiner* — Faye M Fleming
(74) *Attorney, Agent, or Firm* — Sage Patent Group

(57) ABSTRACT

An electric powertrain for a working machine, including:
  a first electric machine,
  a second electric machine,
  a propulsion axle for propulsion of the working machine,
  a transmission assembly comprising:
    a first input shaft drivingly connected to the first electric machine,
    a second input shaft drivingly connected to the second electric machine,
    a first output shaft drivingly connected to the propulsion axle, the first and the second input shafts being selectively drivingly connectable to the first output shaft,
    at least one second output shaft for power take-off, to which the second input shaft is drivingly connected,
    a set of gears including at least two selectable gear ratios for transfer of torque,
  wherein at least the first input shaft is drivingly connectable to the first output shaft via the set of gears.

13 Claims, 3 Drawing Sheets

(51) Int. Cl.
  B60K 17/08 (2006.01)
  B60K 17/28 (2006.01)
  F16H 3/085 (2006.01)
  B60K 25/06 (2006.01)
  B60K 25/00 (2006.01)
  E02F 3/28 (2006.01)
  E02F 9/22 (2006.01)

(52) U.S. Cl.
  CPC .............. B60K 25/06 (2013.01); F16H 3/085 (2013.01); B60K 2025/005 (2013.01); E02F 3/283 (2013.01); E02F 9/22 (2013.01); F16H 2200/0021 (2013.01); F16H 2200/0039 (2013.01)

(56) References Cited

FOREIGN PATENT DOCUMENTS

| | | | |
|---|---|---|---|
| DE | 102018222251 A | 6/2020 | |
| DE | 102019203724 A1 | 9/2020 | |
| DE | 102019203730 A1 | 9/2020 | |
| DE | 102022210381 A1 * | 4/2023 | ............. F16H 3/006 |
| DE | 102022212180 A1 * | 5/2023 | ............... B60K 1/02 |
| JP | 2002356116 A | 12/2002 | |
| JP | 2013/141875 A | 7/2013 | |
| WO | 2021058429 A1 | 4/2021 | |

OTHER PUBLICATIONS

Communication pursuant to Article 94(3) EPC for European Patent Application No. 19835282.5-1012, dated Sep. 21, 2023, 5 pages.

* cited by examiner

ELECTRIC POWERTRAIN AND A WORKING MACHINE

CROSS REFERENCE TO RELATED APPLICATIONS

This application is a 35 U.S.C. § 371 national stage application of PCT International Application No. PCT/EP2019/086228 filed on Dec. 19, 2019, the disclosure and content of which is incorporated by reference herein in its entirety.

TECHNICAL FIELD

The invention relates to an electric powertrain for a working machine and to a working machine.

The invention is applicable on working machines within the fields of industrial construction machines or construction equipment, in particular wheel loaders and wheeled excavators. Although the invention will be described with respect to a wheel loader, the invention is not restricted to this particular machine, but may also be used in other working machines such as articulated haulers, tractors, excavators and backhoe loaders.

BACKGROUND

A working machine such as a wheel loader has different operation cycles in which it utilizes a combination of propulsion and working hydraulics. In working machines powered by internal combustion engines, the drive wheels, used for propulsion of the machine, as well as a power take-off used for hydraulic applications are connected to the engine. However, in electrically operated working machines provided with an electrical powertrain, this can be done in a different way. To increase efficiency, propulsion and working hydraulics may be separated in such electrically operated working machines. This gives a possibility to optimize each function. The downside is that each function may require an unusually high power in certain applications. An example for a wheel loader is when driving loaded in an uphill slope. In this case, the propulsion requires an unusually high power whereas a power demand of the working hydraulics is low. Thus, the electric motor used for propulsion of the wheel loader needs to be dimensioned to be able to provide a high output power which is not needed in many operation cycles, for example short cycle loading. For many applications, the electric motor used for propulsion is therefore oversized.

JP2002356116 discloses an electric powertrain for a tractor, in which a first motor is used for propulsion of the tractor and a second motor is used for driving a power take-off. The second motor may also be used to assist the first motor for propulsion of the tractor in torque demanding applications, such that torque generated by both motors is available for propulsion of the tractor.

With the ongoing electrification within the fields of industrial construction machines and construction equipment, there is a strive to further improve the powertrains of electrically operated working machines and combine powertrain efficiency with a broad power range.

SUMMARY

An object of the invention is to provide an electric powertrain for a working machine and a working machine, which in at least some aspect alleviate at least one drawback of the prior art, or which at least provide a useful alternative. In particular, it is an object to provide an electric powertrain which is suitable for use in a wheel loader and/or a wheeled excavator. Another object is to provide such an electric powertrain enabling efficient usage of relatively small electric machines. Yet another object is to provide an electric powertrain in which torque generated by two electric machines may be efficiently used for a variety of applications with different requirements on driving torque.

According to a first aspect of the invention, at least one of the objects is achieved by an electric powertrain according to claim 1. The powertrain comprises:
a first electric machine,
a second electric machine,
at least one propulsion axle for propulsion of the working machine,
a transmission assembly comprising:
    a first input shaft drivingly connected to the first electric machine,
    a second input shaft drivingly connected to the second electric machine,
    a first output shaft drivingly connected to the at least one propulsion axle, the first input shaft and the second input shaft being selectively drivingly connectable to the first output shaft,
    at least one second output shaft for power take-off from the electric powertrain, the second input shaft being drivingly connected to the at least one second output shaft,
    a set of selectively engageable gears comprising at least two selectable gear ratios for transfer of torque,
wherein at least the first input shaft is drivingly connectable to the first output shaft via the set of selectively engageable gears.

By the provision of an electric powertrain in which at least the first input shaft is drivingly connectable to the first output shaft via the set of selectively engageable gears, the gear ratio used for torque transfer between the first electric machine and the propulsion axle of the working machine may be selected depending on the application. A wider operating range is thereby achieved in comparison with using a single gear ratio for torque transfer from the first electric machine. For torque demanding applications, torque generated by the second electric machine may be used together with torque generated by the first electric machine for propulsion of the working machine. The first electric machine and the set of selectively engageable gears may thereby be tailored and dimensioned for an expected most common use, for example short cycle loading, while the second electric machine is able to assist the first electric machine in the propulsion of the working machine only when necessary.

Since the second input shaft is drivingly connected to the at least one second output shaft, torque is always transferable between the second input shaft and the second output shaft(s), regardless of whether or not the second input shaft is also connected to the first output shaft. Thus, whenever the second electric machine generates torque, the power take-off is driven. The configuration of the transmission assembly allows torque generated by the second electric machine to be simultaneously transferred to both of the first and the second output shafts.

Optionally, at least the first input shaft is independently selectively drivingly connectable to the first output shaft. By "independently" is herein to be understood independently of whether the second input shaft is drivingly connected to the first output shaft or not. In this case, it is possible to drivingly connect only the first input shaft to the first output shaft, without simultaneously connecting the second input shaft to the first output shaft. Thus, the first electric machine may be used for propulsion of the working machine when the second electric machine is not drivingly connected to the first output shaft. If suitable, the first electric machine may thereby be used for propulsion by itself, without simultaneous connection of the second electric machine.

Optionally, the set of selectively engageable gears may comprise at least three selectable gear ratios. By providing at least three selectable gear ratios, efficient use of torque from at least the first input shaft for propulsion of the working machine is enabled.

Optionally, the powertrain may further comprise a set of first clutches, wherein each one of the first clutches may be configured for selectively engaging one gear of the set of selectively engageable gears. The first clutches enable selection of a suitable gear ratio for transmission of torque from at least the first input shaft to the first output shaft. Gear shifting members, such as e.g. shift forks and actuators, may be provided for selective engagement of the first clutches.

The first clutches may preferably be friction clutches, providing a smooth engagement and low shock, although it is also possible to use non-slip clutches.

Optionally, the powertrain may further comprise a second clutch for selectively drivingly connecting the second input shaft to the first output shaft. The second clutch enables selective transfer of torque from the second input shaft to the first output shaft driving the working machine.

The second clutch may preferably be a non-slip clutch such as a dog clutch in order to reduce frictional losses and provide a compact and cost efficient device, although a friction clutch may also be used.

Optionally, the second input shaft may be independently selectively drivingly connectable to the first output shaft. In this case, it is possible to drivingly connect only the second input shaft to the first output shaft, without simultaneously connecting the first input shaft. Thus, the second electric machine may be used for propulsion of the working machine also when the first electric machine is not drivingly connected to the first output shaft. An advantage of this configuration is that torque from the second input shaft, originating from the second electric machine, may be used for propulsion of the working machine while shifting gears for torque transfer from the first input shaft, originating from the first electric machine. Gear shifting without interruption in torque transfer is thereby enabled.

Optionally, a single gear ratio may be provided for drivingly connecting the second input shaft to the first output shaft. A second clutch for connecting the second input shaft to the first output shaft is herein positioned such that the set of selectively engageable gears is bypassed when torque is transferred from the second input shaft to the first output shaft. Hereby, torque from the second input shaft is selectively transferrable to the first output shaft via the single gear ratio, allowing gear shifting for torque transfer from the first input shaft while using the second electric machine for propulsion. The transmission assembly according to this embodiment may be suitable for use in e.g. a wheel loader.

Optionally, the second input shaft may be drivingly connectable to the first output shaft by means of meshing engagement between on one hand an input gear wheel selectively connectable to the second input shaft by means of the second clutch, and on the other hand at least one gear wheel being selectively connectable to the first input shaft by means of one of said first clutches. In this way, torque may be transferred from the second electric machine to the first output shaft without simultaneous torque transfer from the first electric machine to the first output shaft. A single gear ratio may in this way be provided for torque transfer from the second electric machine to the first output shaft.

Optionally, the second input shaft may be drivingly connectable to the first output shaft via the set of selectively engageable gears. An advantage with this configuration is that torque originating from the second electric machine driving the second input shaft may be more efficiently utilized for propulsion of the working machine than by using a single gear ratio for torque transfer between the second input shaft and the first output shaft.

In this case, if none of the selectively engageable gears is engaged, no torque is transferred between the electric machines and the first output shaft or propulsion of the working machine. However, torque generated by both electric machines may be transferred to the second output shaft driving the power take-off. The transmission assembly according to this embodiment may therefore be suitable for use in e.g. a wheeled excavator, since a large amount of torque may be provided to the power take-off when the wheeled excavator is standing still.

Optionally, the powertrain may further comprise a reduction gear arranged for torque transfer between at least the first input shaft and the set of selectively engageable gears.

According to a second aspect of the invention, at least the primary object is achieved by a working machine comprising a powertrain according to the first aspect of the invention.

Advantages and effects provided by the second aspect of the invention are largely analogous to the advantages and effects provided by the first aspect of the invention. It shall also be noted that all embodiments of the second aspect of the invention are applicable to and combinable with all embodiments of the first aspect of the invention and vice versa.

Optionally, the working machine may further comprise at least one piece of equipment configured to be driven by the at least one second output shaft for power take-off.

Optionally, the at least one piece of equipment may comprise at least one hydraulic pump.

Optionally, the working machine may be a wheel loader or a wheeled excavator.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
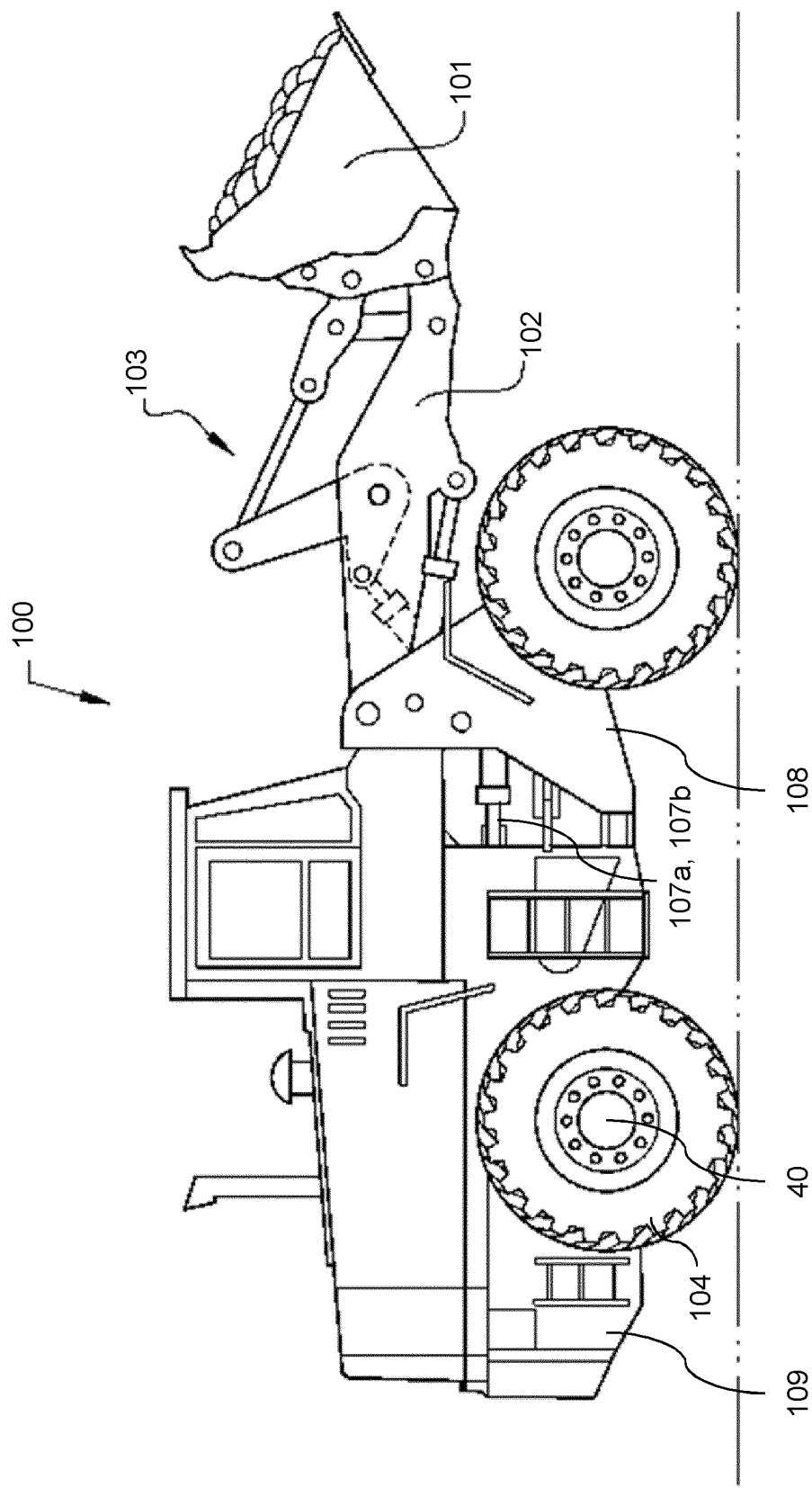
FIG. 1 schematically illustrates a working machine according to an embodiment of the invention, FIG. 2 schematically illustrates a powertrain according to a first embodiment of the invention, FIG. 3 schematically illustrates a powertrain according to a second embodiment of the invention, FIG. 4 schematically illustrates a powertrain according to a third embodiment of the invention, and FIG. 5 schematically illustrates a powertrain according to a fourth embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1. is an illustration of a working machine 100 in the form of a wheel loader. The wheel loader 100 is an example of a working machine in which a powertrain according to embodiments of the invention can be applied. The wheel loader 100 has a bucket 101 which is arranged on a load arm 102 for lifting and lowering the bucket 101. The wheel loader 100 comprises a hydraulic system 103 for lifting, lowering and tilting the bucket 101. The hydraulic system 103 is further configured for steering of the working machine 100 by means of two hydraulic cylinders 107a, 107b arranged on opposite sides of the wheel loader for turning the wheel loader by means of relative movement of a front body part 108 and a rear body part 109. In other words; the working machine is frame-steered by means of the steering cylinders 107a, 107b. The wheel loader is driven by an electric powertrain (not shown in FIG. 1), configured for propulsion of the wheel loader 100 via drive wheels 104 mounted on a propulsion axle 40, as well as for driving at least one hydraulic machine of the hydraulic system 103 via a power take-off (not shown in FIG. 1). The hydraulic machine(s) may preferably be at least one machine configured to function as a hydraulic pump as well as a hydraulic motor with a reversed flow of hydraulic fluid. Such a hydraulic machine with said both functions can be used as a pump for providing the hydraulic system with hydraulic fluid, for example to lift and tilt the bucket 101, and as a hydraulic motor for recuperation of energy, for example during a lowering operation of the load arm 102. The wheel loader 100 further comprises an energy storage system (not shown) for providing electric energy to the electric powertrain.

Figure 2:
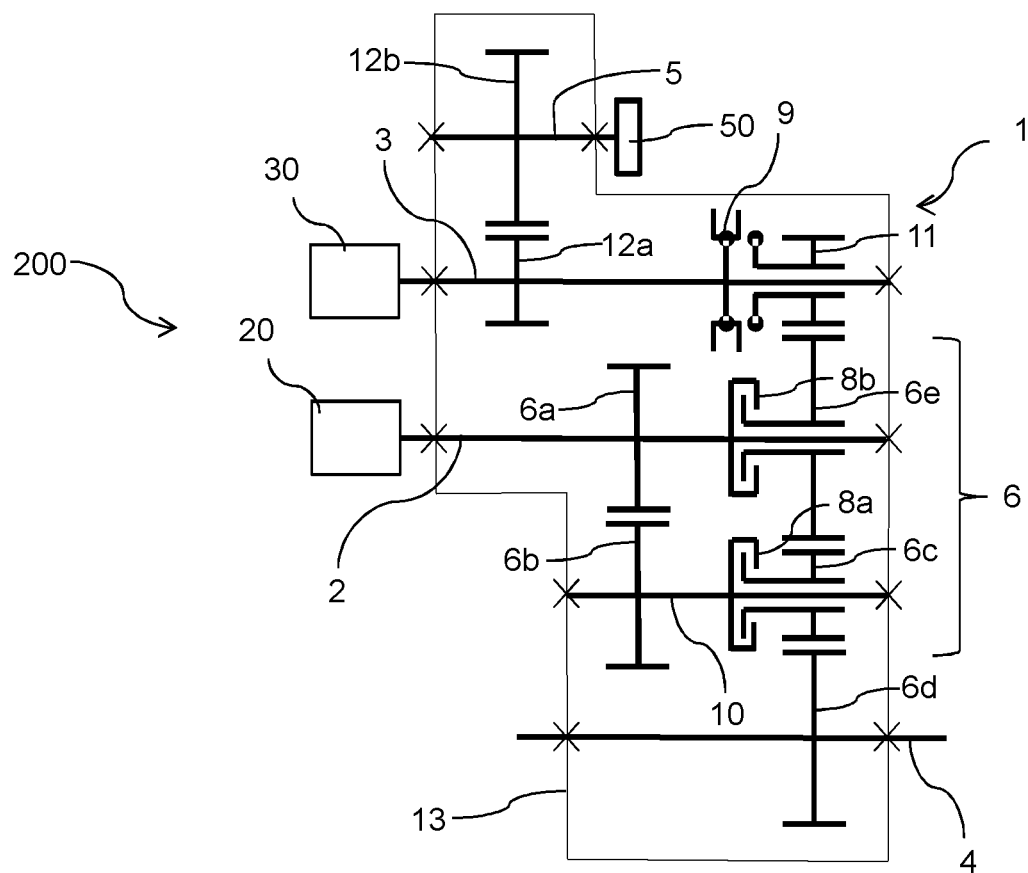

Components of an electric powertrain 200 according to a first embodiment, which may be used in the wheel loader 100, are schematically illustrated in FIG. 2.

The illustrated powertrain 200 comprises a first electric machine 20, which is drivingly connectable to at least one propulsion axle (not shown in FIG. 2), for example the propulsion axle 40 and drive wheels 104 as shown in FIG. 1, for propulsion of the working machine 100 via a transmission assembly 1. The first electric machine 20 is dimensioned and configured for propulsion of the working machine 100 in a forward as well as a rearward direction. The powertrain 200 further comprises a second electric machine 30, which is drivingly connected to a power take-off 50 and may for instance be used for driving the hydraulic machine of the hydraulic system 103. The second electric machine may in this case be dimensioned and configured for powering the hydraulic machine for lifting, lowering and tilting the bucket 101 and for frame steering of the wheel loader.

A first input shaft 2 of the transmission assembly 1 is drivingly connected to the first electric machine 20. A first output shaft 4 of the transmission assembly 1 is drivingly connected to the propulsion axle 40 and the drive wheels 104 (not shown in FIG. 2), and is further selectively drivingly connectable to the first input shaft 2 via a set of selectively engageable gears 6, so that torque may be transferred from the first electric machine 20 to the propulsion axle via the first input shaft 2, the set of selectively engageable gears 6, and the first output shaft 4. The first input shaft 2 is independently drivingly connectable to the first output shaft 4 via the set of selectively engageable gears 6, such that the first electric machine 20 may be used for propulsion by itself, independently of the second electric machine 30.

A second input shaft 3 of the transmission assembly 1 is drivingly connected to the second electric machine 30. A second output shaft 5 for power take-off from the working machine 100 is drivingly connected to the hydraulic pump and to the second input shaft 3, so that torque is transferred from the second electric machine 30 to the hydraulic pump via the second input shaft 3 and the second output shaft 5. The second input shaft 3 is furthermore drivingly connectable to the first output shaft 4, so that torque generated by the second electric machine 30 may be transferred to the propulsion axle.

The set of selectively engageable gears 6 illustrated in FIG. 2 comprises two selectable gear ratios for transfer of torque. A desired gear ratio is selected by engaging one of a set of first clutches 8a, 8b, wherein each one of the first clutches 8a, 8b is configured for selectively engaging one gear of the set of selectively engageable gears. The first clutches 8a, 8b are herein in the form of a first friction clutch 8a and a second friction clutch 8b.

Upon engagement of the first friction clutch 8a, torque is transferable from the first input shaft 2 to the first output shaft 4 via a first input gear wheel 6a connected for common rotation with the first input shaft 2, a first intermediate gear wheel 6b connected for common rotation with an intermediate shaft 10, a second intermediate gear wheel 6c connected for common rotation with the intermediate shaft 10 by means of the first friction clutch 8a, and a first output gear wheel 6d connected for common rotation with the first output shaft 4. Corresponding gear wheels, such as the first input gear wheel 6a and the first intermediate gear wheel 6b, are in meshing engagement. This gear ratio is suitable for driving at relatively low speeds.

Upon engagement of the second friction clutch 8b, torque is transferable from the first input shaft 2 to the first output shaft 4 via a second input gear wheel 6e connected for common rotation with the input shaft 2 by means of the second friction clutch 8b, the second intermediate gear wheel 6c, and the first output gear wheel 6d. This gear ratio is suitable for driving at relatively high speeds.

A second clutch 9 in the form of a dog clutch is further provided for selectively drivingly connecting the second input shaft 3 to the first output shaft 4. When the second clutch 9 is engaged, a third input gear wheel 11 is connected for common rotation with the second input shaft 3. Torque is thereby transferable via the third input gear wheel 11, the second input gear wheel 6e, the second intermediate gear wheel 6c, and the first output gear wheel 6d. In the embodiment illustrated in FIG. 2, a single gear ratio is provided for selective torque transfer between the second electric machine 30 and the first output shaft 4. The second input shaft 3 is independently selectively drivingly connectable to the first output shaft 4, i.e. it may be connected without simultaneous connection of the first input shaft 2. In other words, both friction clutches 8a, 8b may be disengaged while torque is transferred from the second electric machine 30 to the first output shaft 4. While shifting gears for torque transfer between the first electric machine 20 and the first output shaft 4, torque may therefore be transferred continuously without disruption between the second electric machine 30 and the first output shaft 4.

The second input shaft 3 is herein drivingly connectable to the first output shaft 4 by means of meshing engagement between on one hand the third input gear wheel 11, selectively connectable to the second input shaft 3 by means of the second clutch 9, and on the other hand the second input gear wheel 6e, selectively connectable to the first input shaft 2 by means of the second friction clutch 8b, wherein the second input gear wheel 6e is in turn in meshing engagement with the second intermediate gear wheel 6c, meshing with the first output gear wheel 6d.

The second electric machine 30 is drivingly connected to the second output shaft 5 via a fourth input gear wheel 12a, connected for common rotation with the second input shaft 3, and a second output gear wheel 12b, connected for common rotation with the second output shaft 5. When the second clutch 9 is engaged, and furthermore one of the first clutches 8a, 8b, torque may also be transferred between the first electric machine 20 and the second output shaft 5.

The transmission assembly 1 is contained within a schematically illustrated transmission housing 13. Bearings marked by crosses are provided between the transmission housing 13 and the input and output shafts 2, 3, 4, 5, as well as the intermediate shaft 10.

Figure 3:
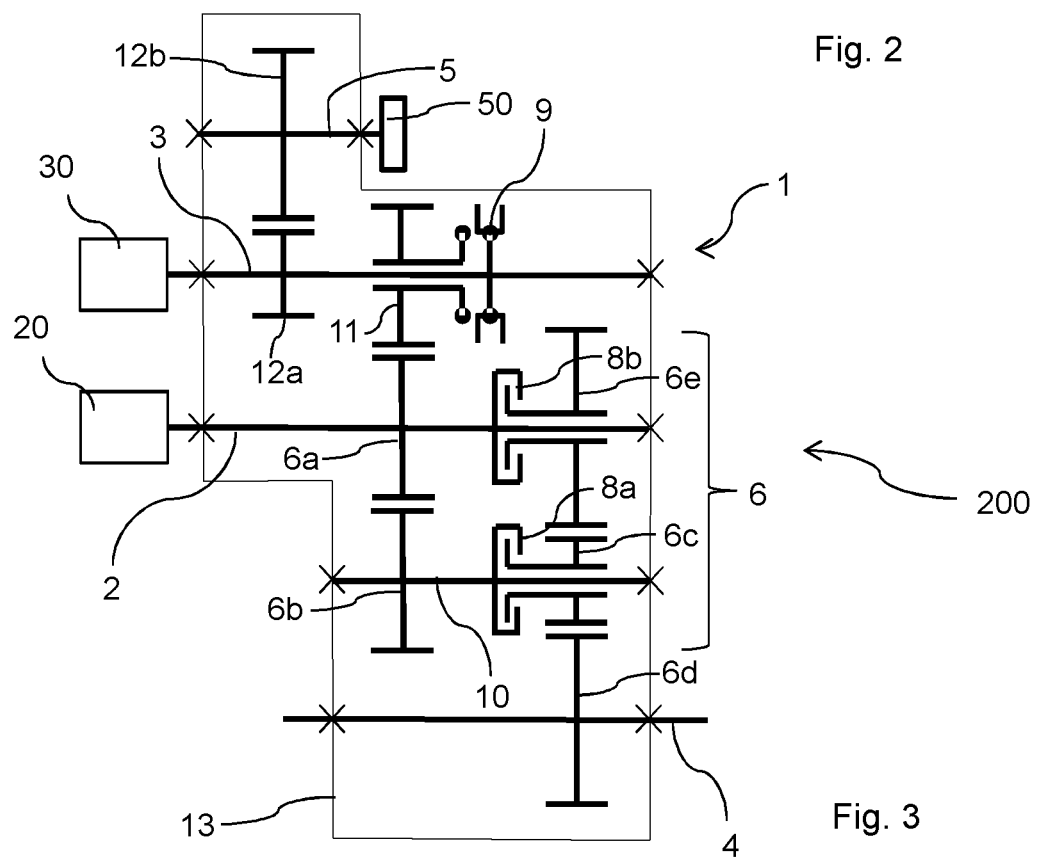

An electric powertrain 200 according to a second embodiment is shown in FIG. 3. The individual components of the second embodiment and the configuration of the set of selectively engageable gears 6 are similar to the first embodiment, and will therefore not be described in detail. The powertrain 200 according to the second embodiment differs from the powertrain according to the first embodiment in that the third input gear wheel 11, which is selectively connectable to the second input shaft 3 by means of the second clutch 9, is in meshing engagement with the first input gear wheel 6a. In this way, torque generated by the second electric machine 30 may only be transferred to the first output shaft 4 via the set of selectively engageable gears 6. Thus, the different gear ratios provided within the same transmission assembly 1 are used for transferring torque generated by both electric machines 20, 30 to the first output shaft 4 for propulsion of the working machine 100. The second input shaft 3 is at all times drivingly connected to the second output shaft 5 via the fourth input gear wheel 12a, and the second output gear wheel 12b, regardless of whether the second clutch 9 is engaged or not. The second input shaft 3 is in this embodiment only drivingly connectable to the first output shaft 4 when also the first input shaft 2 is drivingly connected first output shaft 4, since both input shafts 2, 3 use the set of selectively engageable gears 6 for connection. The first input shaft 2 is however independently drivingly connectable to the first output shaft 4 upon disengagement of the second clutch 9.

In the second embodiment shown in FIG. 3, torque from the first electric machine 20 may also be transferred to the second output shaft 5 upon engagement of the second clutch 9, in this case via the first input shaft 2, the first input gear wheel 6a, the third input gear wheel 11, the second input shaft 3, the fourth input gear wheel 12a, and the second output gear wheel 12b. If at the same time the first clutches 8a, 8b are disengaged, no torque is transferred to the first output shaft 4 for propulsion of the working machine. Instead, torque from both the electric machines 20, 30 is transferred to the second output shaft 5.

Figure 4:
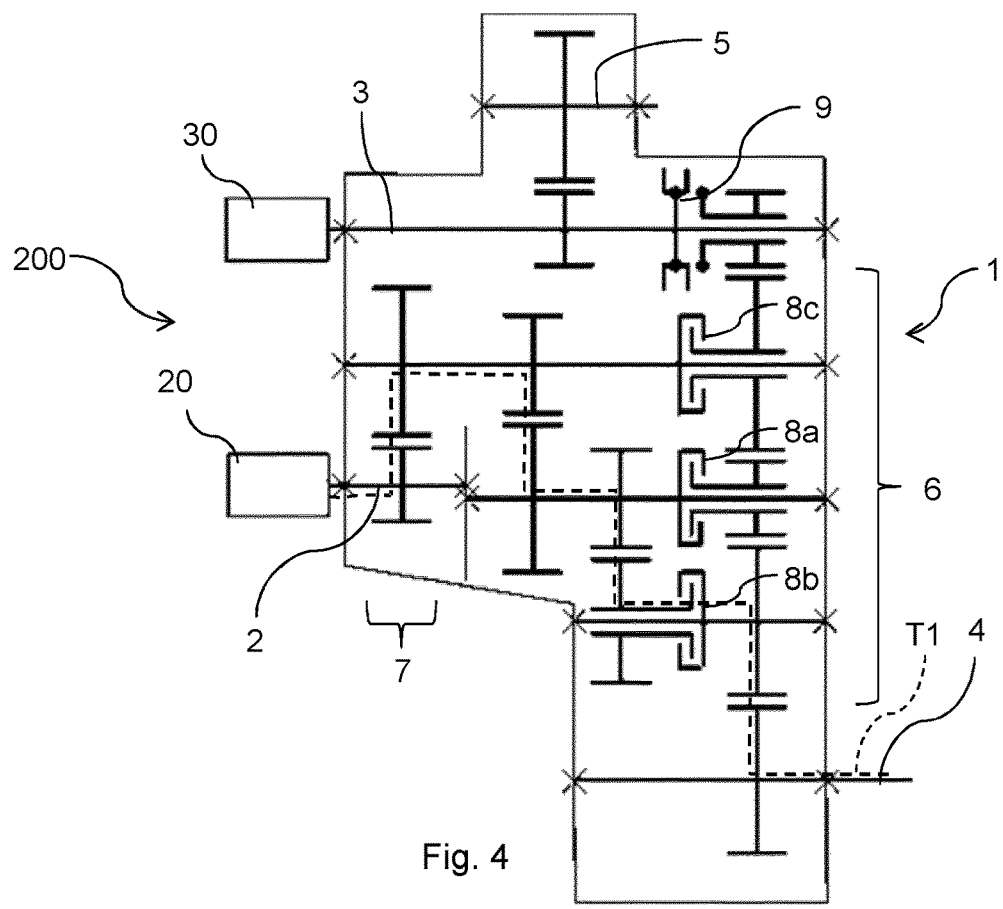

An electric powertrain 200 according to a third embodiment is shown in FIG. 4. The individual components of the third embodiment which are similar to the first embodiment will not be described in detail. The powertrain 200 according to the third embodiment differs from the powertrain according to the first embodiment in that the set of selectively engageable gears 6 of the transmission assembly 1 comprises three selectable gear ratios. Three first clutches 8a, 8b, 8c comprising a first friction clutch 8a for engaging a low speed gear, a second friction clutch 8b for engaging a medium speed gear, and a third friction clutch 8c for engaging a high speed gear are provided for this purpose. Furthermore, a reduction gear 7 is provided for reducing a rotational speed and increasing the torque transferred from the first electric machine 20 at all three gears. An exemplary torque path T1 for transfer of torque at the medium speed gear is illustrated by a dashed line, wherein torque generated by the first electric machine 20 is transferred to the first output shaft 4 via the reduction gear 7 and further via the second friction clutch 8b. Analogously to the first embodiment, the second clutch 9 is provided such that torque generated by the second electric machine 30 is selectively transferable to the first output shaft 4 at a single gear ratio upon engagement of the second clutch 9, bypassing the set of selectively engageable gears 6.

Figure 5:
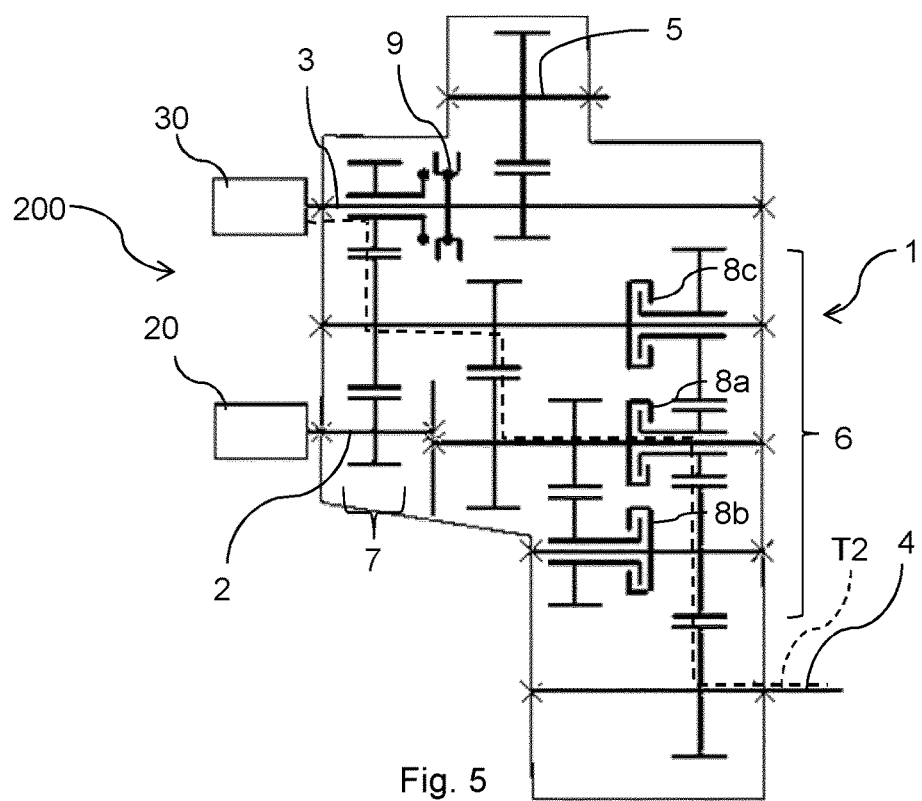

An electric powertrain 200 according to a fourth embodiment is shown in FIG. 5. The powertrain 200 of this embodiment is similar to the powertrain of the third embodiment, but with the second clutch 9 arranged such that it selectively connects the second input shaft 3 to the first output shaft 4 via the reduction gear 7 and the set of selectively engageable gears 6, similarly to the second embodiment shown in FIG. 3. An exemplary torque path T2 for transfer of torque at the low speed gear is illustrated by a dashed line, wherein torque generated by the second electric machine 30 is transferred to the first output shaft 4 via the engaged second clutch 9 (shown in a disengaged position in FIG. 5), the reduction gear 7 and further via the first friction clutch 8a. The second input shaft 3 is at all times drivingly connected to the second output shaft 5. If the first electric machine 20 is also generating torque, torque is simultaneously transferred from the first electric machine 20 via the low speed gear.

The electric machines 20, 30 may in all embodiments be electric machines of the same type or of different types. The electric machines may be configured to be drivable in both directions. For example, the electric machines 20, 30 may be of a type that can regenerate energy and thereby be used for regenerative braking. At least one of the machines may e.g. be a direct current (DC) motor, such as a brushless DC motors. It is also possible that at least one of the machines may be an alternating current (AC) motor. Furthermore, universal motors, or induction motors, or other types of electric motors, may be used, alone or in combination with the above mentioned types of motors.

As the skilled person understands, the configuration of the transmission assembly may be varied within the scope of the claims, for example by providing further gear ratios and/or additional intermediate components. Moreover, more than one power take-off may be provided, such as two or more power take-offs. The first output shaft may also be connected to the at least one propulsion axle using components not shown herein, such as various types of gears. Ground engaging drive members other than drive wheels may also be used for propulsion of the working machine, such as crawlers.

It is to be understood that the present invention is not limited to the embodiments described above and illustrated in the drawings; rather, the skilled person will recognize that many changes and modifications may be made within the scope of the appended claims.

The invention claimed is:

1. An electric powertrain for a working machine, the powertrain comprising:
   a first electric machine,
   a second electric machine,
   at least one propulsion axle for propulsion of the working machine,
   a transmission assembly comprising:
      a first input shaft drivingly connected to the first electric machine,
      a second input shaft drivingly connected to the second electric machine,
      a first output shaft drivingly connected to the at least one propulsion axle, the first input shaft and the second input shaft being selectively drivingly connectable to the first output shaft,
      at least one second output shaft for power take-off from the electric powertrain, the second input shaft being drivingly connected to the at least one second output shaft,
      a set of selectively engageable gears comprising at least two selectable gear ratios for transfer of torque,
   wherein at least the first input shaft is drivingly connectable to the first output shaft via the set of selectively engageable gears,
   characterized in that the second input shaft is independently selectively drivingly connectable to the first output shaft.

2. The powertrain according to claim 1, wherein at least the first input shaft is independently selectively drivingly connectable to the first output shaft.

3. The powertrain according to claim 1, wherein the set of selectively engageable gears comprises at least three selectable gear ratios.

4. The powertrain according to claim 1, further comprising a set of first clutches, wherein each one of the first clutches is configured for selectively engaging one gear of the set of selectively engageable gears.

5. The powertrain according to claim 4, wherein the first clutches are friction clutches.

6. The powertrain according to claim 1, further comprising a second clutch for selectively drivingly connecting the second input shaft to the first output shaft.

7. The powertrain according to claim 6, wherein the second clutch is a non-slip clutch.

8. The powertrain according to claim 1, wherein a single gear ratio is provided for drivingly connecting the second input shaft to the first output shaft.

9. The powertrain according to claim 1, further comprising a reduction gear arranged for torque transfer between at least the first input shaft and the set of selectively engageable gears.

10. A working machine comprising a powertrain according to claim 1.

11. The working machine according to claim 10, further comprising at least one piece of equipment configured to be driven by the at least one second output shaft for power take-off.

12. The working machine according to claim 11, wherein the at least one piece of equipment comprises at least one hydraulic pump.

13. The working machine according to claim 10, wherein the working machine is a wheel loader or a wheeled excavator.

* * * * *